United States Patent

[11] 3,588,137

[72] Inventor Louis Field
 Philadelphia, Pa.
[21] Appl. No. 852,950
[22] Filed Aug. 25, 1969
[45] Patented June 28, 1971
[73] Assignee Allied Tank Truck Equipment Company
 Collegeville, Pa.
 Continuation-in-part of application Ser. No.
 662,181, Aug. 21, 1967, now Patent No.
 3,463,501.

[54] VEHICLE CONSTRUCTION
 9 Claims, 4 Drawing Figs.
[52] U.S. Cl. .................................................. 280/5
[51] Int. Cl. ............................................... B60p 3/22

[50] Field of Search ................................. 280/5, (5 D); 296/35

[56] References Cited
 UNITED STATES PATENTS
 2,556,610 6/1951 Biszantz ..................... 298/17
 3,463,501 8/1969 Field ........................... 280/5(D)
 FOREIGN PATENTS
 946,330 7/1956 Germany .................... 280/5(E)

Primary Examiner—Leo Friaglia
Attorney—Seidel, Gonda & Goldhammer

ABSTRACT: A vehicle body is coupled to a chassis by a rearwardly located transverse pivot, and by pairs of resilient clamping members coupled to opposite sides of the body and the chassis forwardly of the pivot.

INVENTOR
LOUIS FIELD
BY
Seidel, Gonda & Goldhammer
ATTORNEYS.

INVENTOR
LOUIS FIELD
BY
Seidel, Gonda & Goldhammer
ATTORNEYS.

VEHICLE CONSTRUCTION

This is a continuation-in-part of application Ser. No. 662,181, filed Aug. 21, 1967 and now U.S. Pat. No. 3,463,501.

This invention relates to vehicle constructions, and more particularly, to vehicle constructions especially suitable for use in connection with tank truck bodies.

In large vehicles, wracking and bending of the chassis or frame due to twists, turns, dips, holes or other irregularities in the road surface present a considerable problem in regard to mounting of the body. Any perceptible deformation of the chassis results in quite considerable relative movement between the chassis and a body supported thereon. Such movements, if transmitted to the body, result in stress, strain and fatigue on the body, and are known to considerably shorten its useful life. The problem is particularly acute in the case of tank truck bodies, wherein even slight deformation of the body may cause leakage.

The vehicle construction of the present invention is intended to permit the chassis of the vehicle to flex beneath the body without transmitting substantial forces or bending moments to the body.

Accordingly, it is an object of this invention to provide a novel vehicle construction wherein transmission of stresses, strains and moments from the chassis to a body secured thereto is minimized.

It is another object of this invention to provide a novel means for securing a body to the chassis of a vehicle.

It is still another object of this invention to provide a simple means for securing a body to the chassis of a vehicle whereby the body is not subjected to large stresses, strains and moments due to irregularities in the roadway.

It is still another object of this invention to provide a means for securing a body to the chassis of a vehicle especially suited to use with tank-type bodies.

The foregoing and other objects of the invention are realized, in a presently preferred form of the invention, by a vehicle wherein a body is pivoted to a chassis by means of a rearwardly placed transverse pivot, and resilient clamping members are provided on opposite sides of the vehicle, coupled to the body and chassis forwardly of the pivot. Buffers, which may take the form of elongated wooden sills, may be disposed between the body and the chassis to absorb shock and prevent metal-to-metal contact between the chassis and the body.

For the purpose of illustrating the invention, there is shown in the drawings a form which is presently preferred; it being understood, however, that this invention is not limited to the precise arrangements and instrumentalities shown.

Figure 1:
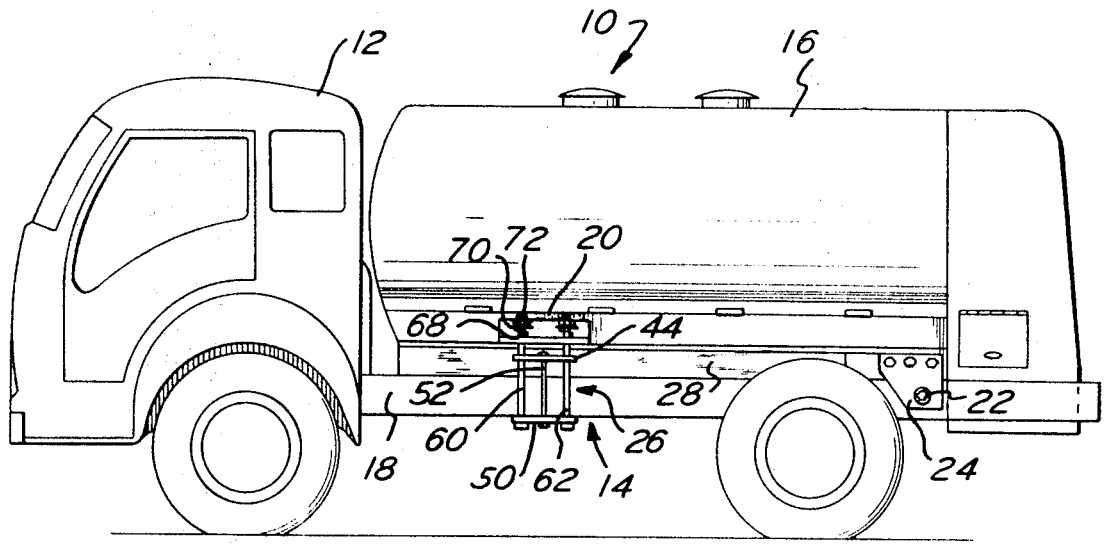
FIG. 1 is an elevation view of a vehicle incorporating the present invention.

Referring now to the drawings in detail, wherein like numerals indicate like elements, there is seen in FIG. 1 a vehicle designated generally by the reference numeral 10. The vehicle 10 includes a cab 12, a chassis designated generally by the reference numeral 14, and a tank-type body designated generally by the reference numeral 16. It should be understood that the tank-type body 16 shown in the drawings is merely illustrative, and that the present invention can be practiced with bodies of any known type. The invention is especially advantageous, however, in vehicles having tank-type bodies.

Figure 2:
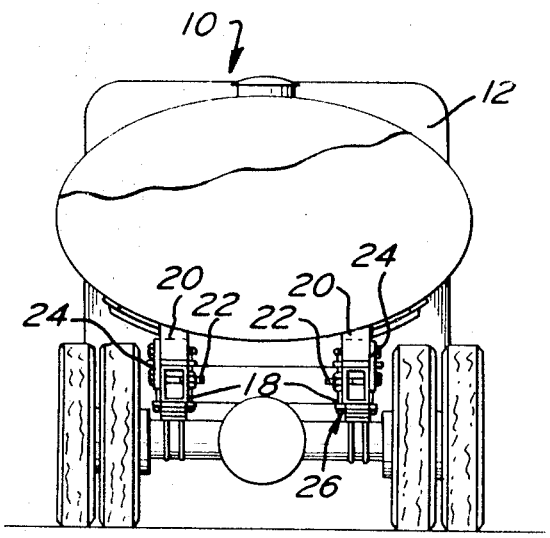
FIG. 2 is a rear elevation view of the vehicle shown in FIG. 1, partially broken away for clarity.

Referring to FIG. 2, the chassis 14 is shown, for the purpose of example, to include longitudinal side rails 18. Also by way of illustration, the body 16 includes depending longitudinally extending beams 20, spaced-apart by a distance corresponding generally to the spacing of the longitudinal side rails 18. A pivot joins the rearward portions of the body 16 and the chassis 14. The pivot may take the form of aligned bolts 22 extending through the longitudinal side rails 18 to define a horizontal pivot axis. The bolts 22 may also extend through depending plates 24, provided for this purpose, and joined to the beams 20 by bolts, welding or the like.

The forward ends of the body 16 and chassis 14 are joined by spaced, longitudinally aligned resilient clamping elements designated generally by the reference numeral 26, the individual elements being located on opposite sides of the chassis 14.

Buffer elements 28, which may take the form of wooden sills, disposed between the side rails 18 and the beams 20, provide a cushioning effect between the chassis 14 and the body 16, and minimize wear on these members.

Figure 3:
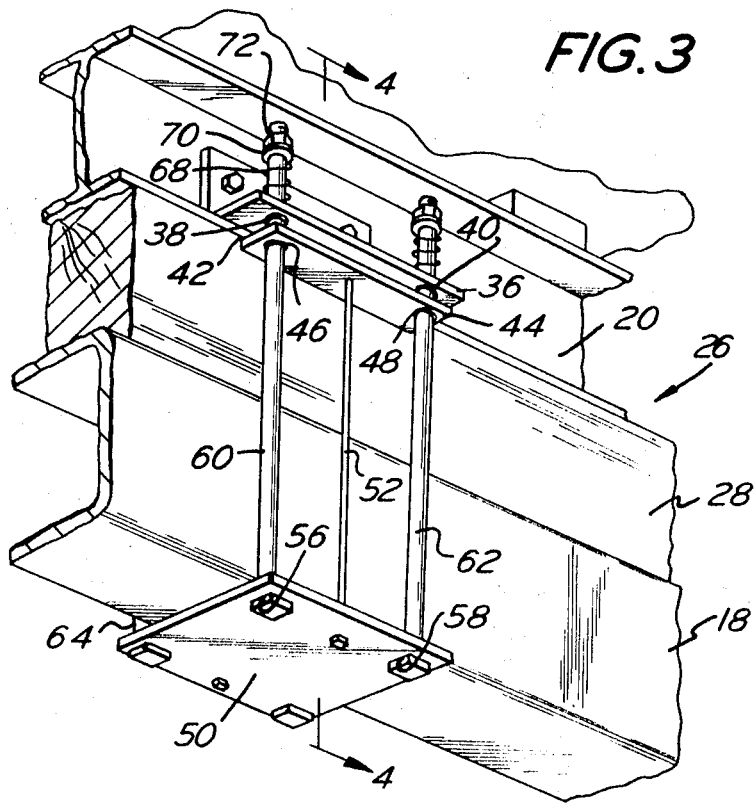
FIG. 3 is a detail view showing a portion of the apparatus of the present invention.
Figure 4:
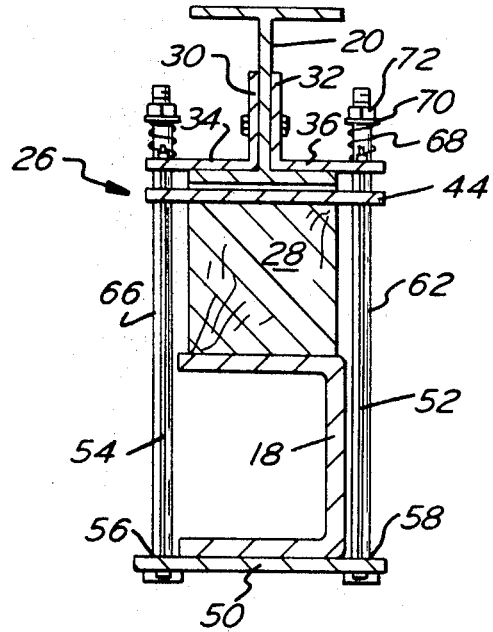
FIG. 4 is a cross-sectional view taken along the line 4—4 in FIG. 3.

Referring now to FIGS. 3 and 4, the presently preferred form of the resilient clamping elements 26 will now be described in detail. Such description will make reference to only one of the elements 26, it being understood that the other is of identical construction.

Members 30, 32, of generally L-shaped cross section, and including outwardly generally horizontally extending flanges 34 and 36, are secured to opposite side faces of the beams 20. The flanges 34, 36 include spaced longitudinally aligned openings 38 and 40.

As is perhaps best seen in FIG. 3, the buffer element 28 in the illustrated embodiment is notched, as at 42, to receive a guide plate 44. The guide plate 44 includes spaced longitudinally aligned openings 46, 48 in alignment with the aforementioned openings 38, 40.

The plate 50, similar in plan shape to the guide plate 44, engages a lower surface of the side rail 18. Tie bars 52 and 54 interconnect the guide plate 44 and plate 50, and hold these elements in engagement with the buffer element 28 and side rail 18, respectively, in sandwich fashion.

The plate 50 includes spaced longitudinally aligned openings 56, 58, in alignment with the openings 46, 48 in the guide plate 44 and 36, 38 in the flanges 34, 36.

Respective bolts 60, 62, 64 and 66 pass through sets of aligned openings in the flanges 34, 36, guide plate 44 and plate 50. For example, the bolt 60 passes through an opening 38 in the flange 36, an opening 46 in the guide plate 44, and an opening 56 in the plate 50. Compression springs 68 are retained about distal ends of the bolts 60–66 by means of washers 70 and nuts 72, in force-transmitting engagement with the flanges 34 and 36. Thus, the springs 68, acting through the washers 70, nuts 72 and the heads of the bolts 60–66 tend to resiliently couple the beams 20 to the buffer elements 28 and side rails 18 and to maintain the forward end of the body 16 in a position wherein its weight is transmitted to the chassis 14. In the event that the chassis 14 is subjected to tortional deflection, the resilient clamping elements 26 substantially isolate stress and strain of the chassis 14 from the body 16. Similarly, should the chassis 14 tend to give to the longitudinal side rails 18 a "swayback" profile, further compression of the springs 68 permits slight separation of the body 16 from the chassis 14 by rotation about the bolts 22.

The present invention may be embodied in other specific forms without departing from the spirit or essential attributes thereof.

I claim:

1. A vehicle having a chassis and a body portion, means for securing said body portion to said chassis, said securing means comprising pivot means extending transversely of said chassis and pivotably coupling the body portion to said chassis, said pivot means being disposed adjacent the rear of said body portion and said chassis, and longitudinally aligned resilient clamping elements disposed on opposite sides of said vehicle forwardly of said pivot means for coupling the forward end of the body portion to the chassis, said clamping elements including means for normally urging the forward end of said body portion resiliently downwardly into overlying weight transmitting relation with respect to the chassis.

2. A vehicle having a chassis and a body portion, said body portion including a pair of longitudinally extending depending beams, buffer elements between said beams and said chassis for transmitting force from said beams to said chassis, means for securing said body portion to said chassis, said securing means comprising pivot means extending transversely of said chassis and pivotably coupling the body portion to said chassis, said pivot means being disposed adjacent the rear of said body portion and said chassis, and longitudinally aligned resilient clamping elements disposed on opposite sides of said vehicle forwardly of said pivot means for coupling the forward end of the body portion to the chassis, said clamping elements including means for normally resiliently maintaining the forward end of said body portion in overlying weight transmitting relation with respect to the chassis.

3. A vehicle in accordance with claim 1, wherein said body portion includes a pair of longitudinally extending depending beams, said clamping elements being coupled to said beams and said chassis.

4. A vehicle having a chassis and a body portion, means for securing said body portion to said chassis, said securing means comprising pivot means extending transversely of said chassis and pivotably coupling the body portion to said chassis, said pivot means being disposed adjacent the rear of said body portion and said chassis, and longitudinally aligned resilient clamping elements disposed on opposite sides of said vehicle forwardly of said pivot means for coupling the forward end of the body portion to the chassis, said clamping elements including means for normally resiliently maintaining the forward end of said body portion in overlying weight transmitting relation with respect to the chassis, said last-mentioned means comprising compression spring members coupled to said chassis and the body portion and biasing the forward end of the body portion downwardly.

5. A vehicle in accordance with claim 4, wherein said body portion includes a pair of longitudinally extending depending beams, said compression spring members being coupled to said chassis and said beams.

6. A vehicle in accordance in accordance with claim 4, 5, and buffer elements disposed between said beams and said chassis for transmitting force from said beams to said chassis.

7. A vehicle having a chassis and a body portion, means for securing said body portion to said chassis, said securing means comprising pivot means extending transversely of said chassis and pivotably coupling the body portion to said chassis, said pivot means being disposed adjacent the rear of said body portion and said chassis, and longitudinally aligned resilient clamping elements disposed on opposite sides of said vehicle forwardly of said pivot means for coupling the forward end of the body portion to the chassis, said chassis including a pair of spaced longitudinal side rails, said clamping elements including a plurality of upwardly extending bolt members disposed on opposite sides of said side rails and coupled thereto, a pair of longitudinally extending depending beams coupled to said body portion, generally horizontally extending flange members coupled to said beams and having openings therein, said bolt members having distal ends thereof extending through said openings, and said clamping elements including means for normally resiliently maintaining the forward end of said body portion in overlying weight transmitting relation with respect to the chassis, said last-mentioned means comprising compression springs disposed about the distal ends of said bolt members and engaging said flange members.

8. A vehicle in accordance with claim 7, and first plates engaging bottom surfaces of said side rails in alignment with said flange members, and second plates disposed between said flange members and said first plates, said bolt members extending through aligned openings in said first and said second plates.

9. A vehicle in accordance with claim 8, and buffer elements disposed between said beams and said chassis for transmitting force from said beams to said chassis, said second plates being coupled to said buffer members.